(12) United States Patent
Akaogi

(10) Patent No.: US 10,646,847 B2
(45) Date of Patent: May 12, 2020

(54) GIS-TYPE ZEOLITE

(71) Applicant: ASAHI KASEI KABUSHIKI KAISHA, Tokyo (JP)

(72) Inventor: Takayuki Akaogi, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/764,689

(22) PCT Filed: Dec. 12, 2017

(86) PCT No.: PCT/JP2017/044602
§ 371 (c)(1),
(2) Date: Mar. 29, 2018

(87) PCT Pub. No.: WO2018/110559
PCT Pub. Date: Jun. 21, 2018

(65) Prior Publication Data
US 2019/0039045 A1 Feb. 7, 2019

(30) Foreign Application Priority Data

Dec. 13, 2016 (JP) .................................. 2016-241319
Feb. 10, 2017 (JP) .................................. 2017-023238

(51) Int. Cl.
*B01J 20/18* (2006.01)
*C01B 39/54* (2006.01)
*C01B 39/46* (2006.01)

(52) U.S. Cl.
CPC ............ *B01J 20/18* (2013.01); *C01B 39/46* (2013.01); *C01B 39/54* (2013.01); *C01P 2002/30* (2013.01); *C01P 2002/74* (2013.01)

(58) Field of Classification Search
CPC ................................ C01B 39/54; B01J 20/18
See application file for complete search history.

(56) References Cited

U.S. PATENT DOCUMENTS 6,350,298 B1 2/2002 Su et al.
2012/0108415 A1 5/2012 Herrmann et al.

FOREIGN PATENT DOCUMENTS

| JP | 6-340417 A | 12/1994 |
| JP | 2000-157862 A | 6/2000 |
| JP | 2006-44978 A | 2/2006 |

(Continued)

OTHER PUBLICATIONS

Markovic et al (Thermally Induced Rings Formation in Aluminosilicate Structures, Journal of Thermal Analysis and Calorimetry, vol. 84 (2006) 1, 253-258). (Year: 2006).*

(Continued)

*Primary Examiner* — Melvin C. Mayes
*Assistant Examiner* — Michael Forrest
(74) *Attorney, Agent, or Firm* — Birch, Stewart, Kolasch & Birch, LLP

(57) ABSTRACT

A GIS-type zeolite having an aluminum atom content of 1% by mass or more and a phosphorus atom content of 4% by mass or less, wherein
a, being an amount of saturation adsorption of carbon dioxide into the GIS-type zeolite, measured when the GIS-type zeolite and carbon dioxide are placed in a system at 25° C. and 760 mmHg, is 5 cm$^3$/g or more at 25° C. and 760 mmHg.

6 Claims, 1 Drawing Sheet

(56) References Cited

FOREIGN PATENT DOCUMENTS

JP          2012-519148 A      8/2012
JP          2015-107450 A      6/2015

OTHER PUBLICATIONS

Sharma et al (GIS-NaP1 zeolite microspheres as potential water adsorption material: Influence of initial silica concentration on adsorptive and physical/topological properties, Sci Rep. 6, 22734 (2016) published on Mar. 11, 2016). (Year: 2016).*

Hernández-Maldonado et al., "Partially Calcined Gismondine Type Silicoaluminophosphate SAPO-43: Isopropylamine Elimination and Separation of Carbon Dioxide, Hydrogen Sulfide, and Water", Langmuir, 2003, vol. 19, pp. 2193-2200.

Oleksiak et al., "Synthesis Strategies for Ultrastable Zeolite GIS Polymorphs as Sorbents for Selective Separations", Chemistry A European Journal, 2016, vol. 22, pp. 16078-16088.

Sharma et al, "Knobby surfaced, mesoporous, single-phase GIS-NaP1 zeolite microsphere synthesis and characterization for $H_2$ gas adsorption", Journal of Materials Chemistry A, 2013, vol. 1, pp. 2602-2612.

International Preliminary Report on Patentability and English translation of the Written Opinion of the International Searching Authority dated Jun. 27, 2019 for Application No. PCT/JP2017/044602.

* cited by examiner

GIS-TYPE ZEOLITE

TECHNICAL FIELD

The present invention relates to a GIS-type zeolite.

BACKGROUND ART

Zeolite can be used for adsorbents, desiccants, separating agents, catalysts, catalyst carriers, detergent aids, ion exchangers, waste water treatment agents, fertilizers, food additives, cosmetic additives and the like, and, in particular, is useful in gas separation applications.

A GIS-type zeolite is disclosed in each of Patent Literatures 1 to 2 and Non-Patent Literatures 1 to 3. Such a GIS-type zeolite here has a GIS structure in codes for directing zeolite structures specified by the International Zeolite Association (IZA).

A GIS-type zeolite is a zeolite having a pore constituted by an oxygen 8-membered ring. Patent Literature 1 describes synthesis of a GIS-type zeolite for effective use of slag of coal burnt ash, and Patent Literature 2 describes an enhancement in thermal conductivity by formation of a zeolite film (GIS-type zeolite) on the surface of an aluminum plate. Non-Patent Literatures 1 and 2 each disclose a GIS-type zeolite of silica/alumina, and adsorption of carbon dioxide is not almost found in all of such disclosures. Non-Patent Literature 3 discloses a GIS-type zeolite of silicoaluminophosphate containing phosphoric acid, and reported that not only adsorption of carbon dioxide, but also adsorption of oxygen, nitrogen and methane were observed.

CITATION LIST

Patent Literatures

Patent Literature 1: Japanese Patent Laid-Open No. 06-340417
Patent Literature 2: National Publication of International Patent Application No. 2012-519148

Non-Patent Literatures

Non-Patent Literature 1: Matthew D. Oleksiak, Arian Ghorbanpour, Marlon T. Conato, B. Peter McGrail, Lars C. Grabow, Radha Kishan Motkuri, Jeffrey D. Rimer "Synthesis Strategies for Ultrastable Zeolite GIS Polymorphs as Sorbents for Selective Separations" Chem. Eur. J. 2016, 22, 16078-16088.
Non-Patent Literature 2: Pankaj Sharma, Jeong-gu Yeo, Moon Hee Han, Churl Hee Cho "Knobby surfaced, mesoporous, single-phase GIS-NaP1 zeolite microsphere synthesis and characterization for H2 gas adsorption" J. Mater. Chem. A, 2013, 1, 2602-2612.
Non-Patent Literature 3: Arturo J. Hernandez-Maldonado, Ralph T. Yang, Daniel Chinn, Curtis L. Munson. "Partially Calcined Gismondine Type Silicoaluminophosphate SAPO-43: Isopropylamine Elimination and Separation of Carbon Dioxide, Hydrogen Sulfide, and Water" Langmuir 2003, 19, 2193-2200.

SUMMARY OF INVENTION

Technical Problem

Focusing on the carbon dioxide adsorption ability of a GIS-type zeolite, for example, the GIS-type zeolite is remarkable in industrial usability if it can selectively remove carbon dioxide from natural gas.

Meanwhile, Patent Literatures 1 to 2 have not mentioned any adsorption of carbon dioxide by zeolite, and it is hardly said according to the structure analysis results shown in such Literatures that a crystal structure necessary for selective adsorption of carbon dioxide is clearly formed. That is, it is considered that the zeolite described in Patent Literatures 1 to 2 is not sufficient in adsorption ability of carbon dioxide and is also low in selectivity of adsorption of carbon dioxide relative to adsorption of methane.

In addition, the zeolite shown in Non-Patent Literatures 1 to 2 does not provide adsorption of carbon dioxide, and cannot separate carbon dioxide and molecules larger in the size than carbon dioxide, such as oxygen, nitrogen and methane, by adsorption and/or gas penetration. The reason for this is considered because a cation (Na) is present in such a zeolite and the cation prevents penetration of carbon dioxide into a pore. In Non-Patent Literature 3, adsorption of carbon dioxide has been observed, but adsorption of oxygen, nitrogen and methane cannot be said to be sufficiently low, and thus the selection rate in terms of separation of carbon dioxide is lower. The reason for this is considered because an 8-membered ring pore of such a zeolite is expanded.

The present invention has been made in view of the above circumstances, and an object thereof is to provide a GIS-type zeolite which has few crystal lattice distortions and defects, which has a crystal structure clearly formed, which can sufficiently adsorb carbon dioxide ($CO_2$) and which is also high in selectivity of adsorption of carbon dioxide relative to the amount of adsorption of methane ($CH_4$), as compared with a conventional GIS-type zeolite.

Solution to Problem

The present inventors have made intensive studies in order to solve the above problems, and as a result, have found that the above problems can be solved by a GIS-type zeolite where the aluminum atom and phosphorus atom contents are within predetermined ranges and the amount of adsorption of carbon dioxide is within a predetermined range, leading to completion of the present invention.

That is, the present invention is as follows.
[1]
A GIS-type zeolite having an aluminum atom content of 1% by mass or more and a phosphorus atom content of 4% by mass or less, wherein
a, being an amount a of saturation adsorption of carbon dioxide into the GIS-type zeolite, measured when the GIS-type zeolite and carbon dioxide are placed in a system at 25° C. and 760 mmHg, is 5 cm³/g or more at 25° C. and 760 mmHg.
[2]
The GIS-type zeolite according to [1], wherein, when heights of peaks around $2\theta=12.4$ and $21.6°$ in a peak obtained by X-ray diffraction are defined as A and B, respectively, $1.37<A/B$ is satisfied.
[3]
The GIS-type zeolite according to [1] or [2], wherein, when heights of peaks around $2\theta=12.4$ and $26.0°$ in a peak obtained by X-ray diffraction are defined as A and C, respectively, $0.35>C/A$ is satisfied.
[4]
The GIS-type zeolite according to any of [1] to [3], wherein the GIS-type zeolite is silica/alumina.

[5]
An adsorbent comprising the GIS-type zeolite according to any one of [1] to [4].

Advantageous Effect of Invention

The present invention can provide a GIS-type zeolite which has few crystal lattice distortions and defects, which has a crystal structure clearly formed, which can sufficiently adsorb carbon dioxide and which is also high in selectivity of adsorption of carbon dioxide relative to the amount of adsorption of methane.

DESCRIPTION OF EMBODIMENTS

Figure 1:
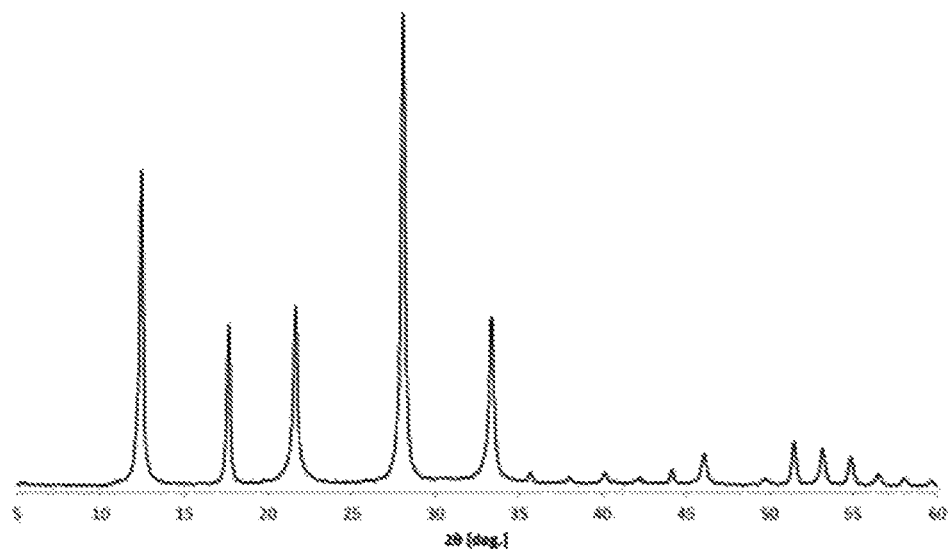
FIG. 1 illustrates an X-ray diffraction (XRD) diagram of a GIS-type zeolite obtained in Example 1.

Hereinafter, an embodiment for carrying out the present invention (hereinafter, referred to as "the present embodiment".) will be described in detail. The present invention is not limited to the following description, and can be variously modified and carried out within the gist thereof.

A GIS-type zeolite of the present embodiment has an aluminum atom content of 1% by mass or more and a phosphorus atom content of 4% by mass or less, and furthermore a, being the amount of saturation adsorption of carbon dioxide into the GIS-type zeolite, measured when the GIS-type zeolite and carbon dioxide are placed in a system at 25° C. and 760 mmHg, is 5 cm$^3$/g or more at 25° C. and 760 mmHg. The GIS-type zeolite of the present embodiment can sufficiently adsorb carbon dioxide and is also high in selectivity of adsorption of carbon dioxide relative to the amount of adsorption of methane.

In the present embodiment, the GIS-type zeolite is preferably silica/alumina from the viewpoint of allowing the selective adsorption ability of carbon dioxide to be more enhanced.

The "silica/alumina" here refers to a GIS-type zeolite including silica and alumina as main components of the GIS-type zeolite (80% by mass or more), in which the content of aluminum is 1% by mass or more, more preferably 3% by mass or more, further preferably 5% by mass or more, the content of phosphorus is 4% by mass or less, and the contents of Zr and Ti are 8% by mass or less.

From the same viewpoint as described above, the phosphorus atom content in the GIS-type zeolite of the present embodiment is more preferably 1.5% by mass or less, particularly preferably 0% by mass.

The aluminum and phosphorus atom contents can be measured by a method described in Examples below. In addition, the aluminum and phosphorus atom contents can be adjusted by, for example, adjusting the compositional ratio of a mixed-gel for use in synthesis of the GIS-type zeolite within a preferable range described below.

(X-Ray Diffraction Peak)
In the GIS-type zeolite of the present embodiment, when the heights of peaks around $2\theta=12.4$ and $21.6°$ in a peak obtained by X-ray diffraction are defined as A and B, respectively, $1.37<A/B$ is satisfied. A peak around $2\theta=12.4°$ is typically observed in the range from $12.15°$ to $12.75°$, and a peak around $2\theta=21.6°$ is typically observed in the range of $2\theta=20.1°$ to $24.1°$.

In an X-ray diffraction peak at 25° C. of the GIS-type zeolite of the present embodiment, peaks at $2\theta=12.4°$ and $21.6°$ correspond to diffraction peaks of (1 0 1) and (2 1 1), respectively. A diffraction peak of (1 0 1) corresponds to diffraction reflecting a periodic structure of an oxygen 8-membered ring of the GIS-type zeolite, and a diffraction peak of (2 1 1) corresponds to diffraction reflecting a finer structure thereof. It is indicated that, when the heights of diffraction peaks of (1 0 1) and (2 1 1) are defined as A and B, respectively, and A/B is here high, a larger periodic structure, namely, a structure including an 8-membered ring structure is clear. It is known that a cation included in zeolite can be moved, and it is considered that there are no deficiencies in a large periodic structure including an 8-membered ring structure and such a structure is clearly formed to thereby result in an increase in the mobility of a cation and to allow the cation to move without interfering in penetration of carbon dioxide into a pore, thereby allowing the adsorption ability of carbon dioxide to be exhibited. From this viewpoint, A/B is preferably more than 1.37, more preferably more than 1.40, further preferably 1.50 or more.

Furthermore, in the GIS-type zeolite of the present embodiment, when the heights of peaks around $2\theta=12.4$ and $26.0°$ in a peak obtained by X-ray diffraction are defined as A and C, respectively, $0.35>C/A$ is preferably satisfied. A peak around at $26.0°$ is a peak derived from an ANA-type zeolite. A peak around $2\theta=26.0°$ is typically observed in the range of $2\theta=25.8°$ to $26.2°$. The ANA-type zeolite is easily produced as an impurity in synthesis of the GIS-type zeolite. The ANA-type zeolite does not adsorb $CO_2$, and thus the amount thereof present is preferably smaller. The amount of ANA present can be determined by a peak of C in XRD. When ANA incorporated in GIS is in an amount such that $0.35>C/A$ is satisfied, more adsorption of carbon dioxide can be made. More preferably $0.25>C/A$ is satisfied, and further preferably $0.1>C/A$ is satisfied.

Herein, the A/B and C/A values can be determined by a method described in Examples below, and both can be adjusted within the above ranges by methods for adjusting the compositional ratio of a mixed-gel, as well as the aging period, conditions in hydrothermal synthesis (heating temperature and heating time), and the like of a mixed-gel within preferable ranges described below.

The peak half-value width obtained by X-ray diffraction represents crystallinity of a crystal lattice plane on which the diffraction occurs, and is preferably narrow. The ranges of the peak half-value widths around $2\theta=12.4$ and $21.6°$ are, respectively, preferably 0.44 deg or less and 0.80 deg or less, more preferably 0.40 deg or less and 0.70 deg or less, further preferably 0.35 deg or less and 0.60 deg or less. The present inventors have thus presumed that the structure of the GIS-type zeolite indicated by such peak half-value widths enables $CH_4$ not to penetrate into the crystal lattice and thus to be adsorbed in a decreased amount, and also enables deficiencies at an adsorption site of $CO_2$ not to occur, to thereby maximize the amount of adsorption of $CO_2$, thereby maximizing the ratio of the amounts of adsorption, $CO_2/CH_4$.

The range of the peak half-value width around $2\theta=26.1°$ is preferably 0.65 deg or less, more preferably 0.60 deg or less, further preferably 0.50 deg or less. The present inventors have thus presumed that, when the structure of the ANA-type zeolite indicated by such a peak half-value width is generated, impurities hardly detected as peaks in XRD, such as an amorphous form, can be less present, to thereby maximize the amount of adsorption of $CO_2$.

Herein, the peak half-value width can be each adjusted within the above range by methods for adjusting the compositional ratio of a mixed-gel, as well as conditions in hydrothermal synthesis (heating temperature and heating time), and the like of a mixed-gel within preferable ranges described below.

(Synthesis Method)

A method for producing a GIS-type zeolite according to the present embodiment can include, for example, a step of preparing of a mixed gel containing a silica source including silicon, an aluminum source including aluminum, an alkali metal source including at least one selected from an alkali metal (M1) and an alkali earth metal (M2), a phosphorus source including phosphorus, and water. Hereinafter, the mixed gel and each component included therein will be described.

[Mixed Gel]

The mixed gel in the present embodiment is a mixture including a silica source, an aluminum source, an alkali metal source and water as components and, if necessary, including a phosphorus source and an organic structure-directing agent.

The silica source refers to a component in the mixed gel, serving as a starting material of silicon included in a zeolite produced from the mixed gel, the aluminum source refers to a component in the mixed gel, serving as a starting material of aluminum included in a zeolite produced from the mixed gel, the alkali metal source refers to a component in the mixed gel, serving as starting material(s) of an alkali metal and/or an alkali earth metal included in a zeolite produced from the mixed gel, and the phosphorus source refers to a component in the mixed gel, serving as a starting material of phosphorus included in a zeolite produced from the mixed gel.

[Silica Source]

The silica source is not particularly limited as long as it is one commonly used, and specific examples thereof include sodium silicate, amorphous silica, colloidal silica, wet method silica, dry method silica, silica gel, amorphous aluminosilicate gel, tetraethoxysilane (TEOS) and trimethylethoxysilane. These compounds may be used singly or in combinations of a plurality thereof. Here, amorphous aluminosilicate gel serves as the silica source and also serves as the aluminum source.

Among them, sodium silicate is preferable from the viewpoint that a zeolite high in the degree of crystallinity tends to be obtained.

[Aluminum Source]

The aluminum source is not particularly limited as long as it is one commonly used, and specific examples thereof include sodium aluminate, aluminum sulfate, aluminum nitrate, aluminum acetate, aluminum hydroxide, aluminum oxide, aluminum chloride, aluminum alkoxide, metallic aluminum and amorphous aluminosilicate gel. These compounds may be used singly or in combinations of a plurality thereof.

Among them, sodium aluminate, aluminum sulfate, aluminum nitrate, aluminum acetate, aluminum hydroxide, aluminum chloride or aluminum alkoxide is preferable from the viewpoint that a zeolite high in the degree of crystallinity tends to be obtained. From the same viewpoint, sodium aluminate or aluminum hydroxide is more preferable, and sodium aluminate is further preferable.

[Alkali Metal Source]

The alkali type in the alkali metal source is not particularly limited, and any alkali metal and/or any alkali earth metal compound can be used.

Examples of the alkali metal source include, but not limited to the following, hydroxide, hydrogen carbonate, carbonate, acetate, sulfate and nitrate of an alkali metal or an alkali earth metal. These compounds may be used singly or in combinations of a plurality thereof.

The alkali metal and the alkali earth metal for use in the alkali metal source can be usually Li, Na, K, Rb, Cs, Ca, Mg, Sr, Ba or the like. Na or K is preferable and Na is more preferable, from the viewpoint of more facilitating crystal formation of the GIS-type backbone. The alkali metal and the alkali earth metal for use in the alkali metal source may be used singly or in combinations of a plurality thereof.

Specific examples of the alkali metal source include, but not limited to the following, sodium hydroxide, sodium acetate, sodium sulfate, sodium nitrate, sodium carbonate, sodium hydrogen carbonate, potassium hydroxide, potassium acetate, potassium sulfate, potassium nitrate, potassium carbonate, potassium hydrogen carbonate, lithium hydroxide, lithium acetate, lithium sulfate, lithium nitrate, lithium carbonate, lithium hydrogen carbonate, rubidium hydroxide, rubidium acetate, rubidium sulfate, rubidium nitrate, rubidium carbonate, rubidium hydrogen carbonate, cesium hydroxide, cesium acetate, cesium sulfate, cesium nitrate, cesium carbonate, cesium hydrogen carbonate, calcium hydroxide, calcium acetate, calcium sulfate, calcium nitrate, calcium carbonate, calcium hydrogen carbonate, magnesium hydroxide, magnesium acetate, magnesium sulfate, magnesium nitrate, magnesium carbonate, magnesium hydrogen carbonate, strontium hydroxide, strontium acetate, strontium sulfate, strontium nitrate, strontium carbonate, strontium hydrogen carbonate, barium hydroxide, barium acetate, barium sulfate, barium nitrate, barium carbonate and barium hydrogen carbonate.

Among them, sodium hydroxide, potassium hydroxide, lithium hydroxide, rubidium hydroxide, cesium hydroxide, calcium hydroxide, magnesium hydroxide, strontium hydroxide or barium hydroxide is preferable, sodium hydroxide, potassium hydroxide, lithium hydroxide, rubidium hydroxide or cesium hydroxide is more preferable, and sodium hydroxide is further preferable.

[Phosphorus Source]

The phosphorus source is not particularly limited as long as it is one commonly used, and specific examples thereof include an aqueous phosphoric acid solution, sodium phosphate, aluminum phosphate, potassium phosphate, lithium phosphate, calcium phosphate and barium phosphate. These compounds may be used singly or in combinations of a plurality thereof.

Among them, an aqueous phosphoric acid solution, sodium phosphate or aluminum phosphate is preferable. From the same viewpoint, an aqueous phosphoric acid solution or sodium phosphate is more preferable and an aqueous phosphoric acid solution is further preferable from the viewpoint that a zeolite high in the degree of crystallinity tends to be obtained.

[Organic Structure-Directing Agent]

The organic structure-directing agent in the case of zeolite production by hydrothermal synthesis of the mixed gel is a compound acting as promoting crystallization to a zeolite structure. In zeolite crystallization, the organic structure-directing agent can be, if necessary, used.

Any organic structure-directing agent may be adopted as the organic structure-directing agent without any limitation in terms of the type as long as it can form a desired GIS-type zeolite. The organic structure-directing agent may be used singly or in combinations of a plurality thereof.

Examples of the organic structure-directing agent which may be used herein include, but not limited to the following, amines, quaternary ammonium salts, alcohols, ethers, amides, alkyl ureas, alkyl thioureas, cyanoalkanes, and alicyclic heterocyclic compounds including nitrogen as a hetero atom can be used, and alkylamines are preferably used and isopropylamine is more preferably used.

Such salts may have an anion. Representative examples of such an anion include, but not limited to the following, a halogen ion such as $Cl^-$, $Br^-$ and $I^-$, a hydroxide ion, an acetate ion, a sulfate ion, a nitrate ion, a carbonate ion, and a hydrogen carbonate ion. Among them, a halogen ion or a hydroxide ion is preferable and a halogen ion is more preferable, from the viewpoint of more facilitating crystal formation of the GIS-type backbone.

[Compositional Ratio of Mixed-Gel]

The ratio between the silica source and the aluminum source in the mixed gel is represented as the molar ratio of the oxides of the corresponding elements, namely, $SiO_2/Al_2O_3$.

The ratio $SiO_2/Al_2O_3$ is not particularly limited as long as zeolite can be formed, and the ratio is preferably 4.0 or more and 70.0 or less, more preferably 4.2 or more and 68.0 or less, further preferably 5.0 or more and 60.0 or less, still further preferably 5.3 or more and 58.0 or less, furthermore preferably 6.0 or more and 50.0 or less, still furthermore preferably 6.5 or more and 49.0 or less because formation of a zeolite having a backbone different from the GIS-type backbone tends to be able to be suppressed.

The ratio between the aluminum source and the alkali metal source in the mixed gel is represented by the molar ratio of the sum of $M1_2O$ and $M2O$ to $Al_2O_3$, namely, $(M1_2O+M2O)/Al_2O_3$ (wherein M1 represents the alkali metal and M2 represents the alkali earth metal). Herein, the ratio $(M1_2O+M2O)/Al_2O_3$ is preferably 1.3 or more, more preferably 1.4 or more, further preferably 1.5 or more, still further preferably 1.6 or more, furthermore preferably 1.7 or more, still furthermore preferably 1.8 or more, from the viewpoint of more facilitating crystal formation of the GIS-type backbone.

The ratio $(M1_2O+M2O)/Al_2O_3$ is preferably 2.0 or more and 80.0 or less, more preferably 2.2 or more and 78.0 or less, further preferably 2.5 or more and 70.0 or less, still further preferably 2.7 or more and 68.0 or less, furthermore preferably 3.0 or more and 60.0 or less, still furthermore preferably 3.3 or more and 56.0 or less, from the viewpoint that formation of a zeolite having a backbone different from the GIS-type backbone can be suppressed.

The ratio between the phosphorus source and the aluminum source in the mixed gel is represented as the molar ratio of the oxides of the corresponding elements, namely, $P_2O_5/Al_2O_3$.

The ratio $P_2O_5/Al_2O_3$ is not particularly limited as long as zeolite can be formed, and the ratio is preferably less than 1.0, more preferably 0.6 or less, further preferably 0.4 or less, particularly preferably 0 because formation of a zeolite having a backbone different from the GIS-type backbone tends to be able to be suppressed.

When the organic structure-directing agent is included in the mixed gel, the ratio between the aluminum source and the organic structure-directing agent in the mixed gel is represented by the molar ratio of the organic structure-directing agent to $Al_2O_3$, namely, $R/Al_2O_3$ (wherein R represents the organic structure-directing agent). The ratio is preferably less than 10.0, more preferably 8.0 or less, further preferably 6.0 or less, from the viewpoint of more facilitating crystal formation of the GIS-type backbone and/or decreasing the synthesis period to allow economic efficiency in zeolite production to be excellent.

The ratio between the aluminum source and water in the mixed gel is represented by the molar ratio of water to $Al_2O_3$, namely, $H_2O/Al_2O_3$. The ratio is preferably 100 or more, more preferably 200 or more, from the viewpoint that the components in the mixed gel tend to be more uniformly dispersed. The ratio is further preferably 300 or more from the viewpoint that formation of a zeolite having a backbone different from the GIS-type backbone can be suppressed.

The ratio $H_2O/Al_2O_3$ is preferably 3000 or less, more preferably 2000 or less, from the viewpoint of decreasing the synthesis period to allow economic efficiency in zeolite production to be excellent. The ratio is further preferably 1500 or less from the viewpoint that formation of a zeolite having a backbone different from the GIS-type backbone can be suppressed.

As described above, the method for producing a GIS-type zeolite according to the present embodiment includes a step of preparing of a mixed gel containing: a silica source including silicon; an aluminum source including aluminum; an alkali metal source including at least one selected from an alkali metal (M1) and an alkali earth metal (M2); a phosphorus source; and water, wherein, when the molar ratios of components in the mixed gel are calculated (the molar ratios are calculated in terms of oxides of corresponding elements with respect to the silicon, the aluminum, the alkali metal (M1), the alkali earth metal (M2) and the phosphorus source), the molar ratios α, β, γ and δ represented by the following expressions (1), (2), (3) and (4) preferably satisfy 4.0≤α≤70.0, 2.0≤β≤80.0, 0≤γ<1.0 and 100≤δ≤3000, and preferably satisfy 4.2≤α≤68.0, 2.2≤β≤78.0, 0≤γ<1.0 and 100≤δ≤3000. The GIS-type zeolite according to the present embodiment is particularly preferably one obtained by the method for producing a GIS-type zeolite according to the present embodiment.

$$\alpha=SiO_2/Al_2O_3 \quad (1)$$

$$\beta=(M1_2O+M2O)/Al_2O_3 \quad (2)$$

$$\gamma=P_2O_5/Al_2O_3 \quad (3)$$

$$\delta=H_2O/Al_2O_3 \quad (4)$$

Furthermore, in the method for producing a GIS-type zeolite according to the present embodiment, preferably, the molar ratios α, β, γ and δ satisfy the above ranges, and when the mixed gel further includes an organic structure-directing agent R, the molar ratio ε represented by the following expression (5) preferably satisfies ε<10.

$$\varepsilon=R/Al_2O_3 \quad (5)$$

Although a seed crystal is not necessarily needed to be present in the mixed gel, a GIS-type zeolite produced in advance can also be added as a seed crystal to the mixed gel, to provide the GIS-type zeolite of the present embodiment.

[Step of Preparing Mixed Gel]

The step of preparing a mixed gel is not particularly limited, and examples thereof may include a mixing step of mixing a silica source, an aluminum source, an alkali metal source, water, and, if necessary, an organic structure-directing agent at one time or at multiple stages, and an aging step of the mixture obtained in the mixing step.

The mixing step can mix components including the silica source, the aluminum source, the alkali metal source, water, and, if necessary, the organic structure-directing agent at one time or at multiple stages.

The order in mixing at multiple stages is not limited, and may be appropriately selected depending on conditions used. The mixing at multiple stages may be performed either with stirring or without stirring.

In stirring, a stirring method commonly used is adopted without any particular limitation, and specific examples include methods using blade stirring, vibration stirring, oscillation stirring, and centrifugation stirring, and the like.

The rotational speed in stirring is not particularly limited as long as it is a stirring speed commonly used, and is, for example, 1 rpm or more and less than 2000 rpm.

The temperature in the mixing step is not particularly limited as long as it is a temperature commonly used, and is, for example, −20° C. or more and less than 80° C.

The period for the mixing step is not particularly limited and can be appropriately selected depending on the temperature in the mixing step, and is, for example, more than 0 minutes and 1000 hours or less.

The aging step may be performed with either standing or stirring.

In stirring in the aging step, a stirring method commonly used is adopted without any particular limitation, and specific examples thereof include methods using blade stirring, vibration stirring, oscillation stirring, and centrifugation stirring.

The rotational speed in stirring is not particularly limited as long as it is a stirring speed commonly used, and is, for example, 1 rpm or more and less than 2000 rpm. The temperature in the aging step is not particularly limited as long as it is a temperature commonly used, and is, for example, −20° C. or more and less than 80° C.

The period for the aging step is not particularly limited, can be appropriately selected depending on the temperature in the aging step, and is, for example, more than 0 minutes and 1000 hours or less.

It is considered in zeolite production that dissolution of starting materials and production and re-dissolution of a zeolite precursor occur in the mixing step and the aging step of starting materials. In order to form a large periodic structure including an 8-membered ring without the occurrence of defects and the like, it is preferable not to allow formation of a zeolite precursor to excessively progress. When formation of a zeolite precursor excessively progresses, it is preferable not to excessively age such a precursor because generation of an ANA-type zeolite having a more stable structure tends to be increased. On the other hand, starting materials are preferably sufficiently mixed to provide a uniform starting material gel. From these viewpoints, the total period for the mixing step and the aging step combined is preferably 1 minute or more and less than 24 hours, more preferably 1 minute or more and less than 23 hours, further preferably 2 minutes or more and 12 hours or less, still further preferably 2 minutes or more and 10 hours or less, furthermore preferably 3 minutes or more and 2 hours or less, still furthermore preferably 3 minutes or more and 1.5 hours or less.

[Hydrothermal Synthesis Step]

The method for producing a GIS-type zeolite according to the present embodiment preferably further includes a hydrothermal synthesis step where the hydrothermal synthesis temperature is 80° C. to 145° C., and the hydrothermal synthesis temperature is more preferably 80° C. to 140° C. That is, the mixed gel obtained in the preparation step is preferably subjected to hydrothermal synthesis with being kept at a predetermined temperature for a predetermined period with stirring or standing.

The temperature in the hydrothermal synthesis is not particularly limited as long as it is a temperature commonly used, and it is preferably 80° C. or more from the viewpoint of decreasing the synthesis period to allow economic efficiency in zeolite production to be excellent. The temperature is more preferably 90° C. or more, further preferably 100° C. or more, from the viewpoint that formation of a zeolite having a backbone different from the GIS-type backbone can be suppressed.

The temperature is more preferably 145° C. or less, further preferably 140° C. or less, further preferably 135° C. or less, from the viewpoint that formation of a zeolite having a backbone different from the GIS-type backbone can be suppressed.

The temperature in the hydrothermal synthesis may be constant or may be changed stepwise.

The period for the hydrothermal synthesis is not particularly limited as long as it is a period commonly used, and can be appropriately selected depending on the temperature in the hydrothermal synthesis.

The period for the hydrothermal synthesis is preferably 3 hours or more, more preferably 10 hours or more, from the viewpoint that the GIS backbone is formed. The period is further preferably 24 hours or more from the viewpoint that a GIS-type zeolite high in crystallinity is obtained.

The period for the hydrothermal synthesis is preferably 30 days or less, more preferably 20 days or less, further preferably 10 days or less, from the viewpoint of allowing the economic efficiency in zeolite production to be excellent.

The container to which the mixed gel is loaded in the hydrothermal synthesis step is not particularly limited as long as it is a container commonly used, and when the pressure in the container is increased at a predetermined temperature or is gas pressure not inhibiting crystallization, the mixed gel is preferably loaded in a pressure-resistant container and subjected to the hydrothermal synthesis.

The pressure-resistant container is not particularly limited, and a pressure-resistant container having any of various shapes such as spherical, longitudinally elongated, and horizontally elongated shapes can be used.

When the mixed gel in the pressure-resistant container is stirred, the pressure-resistant container is rotated vertically and/or laterally, preferably rotated vertically.

When the pressure-resistant container is rotated vertically, the rotational speed is not particularly limited as long as it is within a range commonly used, and it is preferably 1 to 50 rpm, more preferably 10 to 40 rpm.

In the hydrothermal synthesis step, examples of preferable stirring of the mixed gel include a method including using a pressure-resistant container having a longitudinally elongated shape and vertically rotating it.

[Separation/Drying Step]

After the hydrothermal synthesis step, the solid as the product and the liquid including water are separated, and the separation method is not particularly limited as long as it is a common method. Filtration, decantation, a spray-drying method (rotary atomization, nozzle atomization, ultrasonic atomization or the like), a drying method using a rotary evaporator, a vacuum drying method, a freeze-drying method, a natural drying method, or the like can be used, and separation can be usually made by filtration or decantation.

The resultant from separation may be used as it is, or may be washed with water or a predetermined solvent. The resultant from separation can be, if necessary, dried.

The temperature at which the resultant from separation is dried is not particularly limited as long as it is a common drying temperature, and it is usually from room temperature to 150° C. or less.

The atmosphere during drying is not particularly limited as long as it is an atmosphere commonly used, and an air atmosphere, or an atmosphere to which an inert gas such as nitrogen or argon, or oxygen is added is usually used.

[Calcining Step]

A GIS-type zeolite, if necessary, calcined can be used. The calcining temperature is not particularly limited as long as it is a temperature commonly used, and it is preferably 300° C. or more, more preferably 350° C. or more, from the viewpoint that, when the organic structure-directing agent is desired to be removed, the proportion thereof remaining can be decreased. The temperature is further preferably 400° C. or more from the viewpoint that the calcining period is decreased to allow the economic efficiency in zeolite production to be excellent.

The temperature is preferably less than 550° C., more preferably 530° C. or less, further preferably 500° C. or less because crystallinity of zeolite tends to be retained.

The calcining period is not particularly limited as long as it is a period where the organic structure-directing agent is sufficiently removed, and it can be appropriately selected depending on the calcining temperature and is preferably 0.5 hours or more, more preferably 1 hour or more, further preferably 3 hours or more because the proportion of the remaining organic structure-directing agent tends to be able to be decreased.

The calcining period is preferably 20 days or less, more preferably 10 days or less, further preferably 7 days or less because crystallinity of zeolite tends to be retained.

The calcining atmosphere is not particularly limited as long as it is an atmosphere commonly used, and an air atmosphere, or an atmosphere to which an inert gas such as nitrogen or argon, or oxygen is added is usually used.

[Cation Exchange]

The GIS-type zeolite can be, if necessary, subjected to cation exchange to a desired cation type. In such cation exchange, without limitation to the following, for example, nitrate such as $NH_4NO_3$, $LiNO_3$, $NaNO_3$, $KNO_3$, $RbNO_3$, $CsNO_3$, $Be(NO_3)_2$, $Ca(NO_3)_2$, $Mg(NO_3)_2$, $Sr(NO_3)_2$ or $Ba(NO_3)_2$, or a salt where a nitrate ion included in the nitrate is changed to a halide ion, a sulfate ion, a carbonate ion, a hydrogen carbonate ion, an acetate ion, a phosphate ion or a hydrogen phosphate ion, or an acid such as nitric acid or hydrochloric acid can be used.

The cation exchange temperature is not particularly limited as long as it is a common cation exchange temperature, and it is usually from room temperature to 100° C. or less.

In separation of zeolite after such cation exchange, the separation method is not particularly limited as long as it is a common method. Filtration, decantation, a spray-drying method (rotary atomization, nozzle atomization, ultrasonic atomization or the like), a drying method using a rotary evaporator, a vacuum drying method, a freeze-drying method, a natural drying method, or the like can be used, and separation can be usually made by filtration or decantation.

The resultant from separation may be used as it is, or may be washed with water or a predetermined solvent. The resultant from separation can be, if necessary, dried.

The temperature at which the resultant from separation is dried is not particularly limited as long as it is a common drying temperature, and it is usually from room temperature to 150° C. or less.

The atmosphere during drying is not particularly limited as long as it is an atmosphere commonly used, and an air atmosphere, or an atmosphere to which an inert gas such as nitrogen or argon, or oxygen is added is usually used.

Furthermore, an ammonium-type zeolite can also be calcined and thus converted to a proton-type zeolite.

The GIS-type zeolite of the present embodiment is not particularly limited in the application thereof, and can be used for, for example, separating agents or separation membranes for various gases and liquids, electrolyte membranes for fuel cells and the like, fillers of various resin molded articles, membrane reactors, catalysts for hydrocracking, alkylation and the like, catalyst carriers for carrying metals, metal oxides, and the like, adsorbents, desiccants, detergent aids, ion exchangers, waste water treatment agents, fertilizers, food additives, cosmetic additives, and the like.

Among the above, the GIS-type zeolite of the present embodiment can be suitably used as an adsorbent. That is, an adsorbent of the present embodiment includes the GIS-type zeolite of the present embodiment. The adsorbent of the present embodiment is thus configured, and thus can sufficiently adsorb carbon dioxide and is also high in selectivity of adsorption of carbon dioxide relative to the amount of adsorption of methane. Therefore, the adsorbent can be particularly preferably used for the purpose of, for example, selective removal of carbon dioxide from natural gas.

Figure 2:
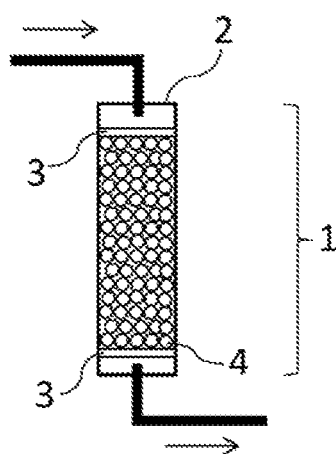
FIG. 2 illustrates a view exemplifying an adsorbent according to one embodiment of the present invention.

The adsorbent of the present embodiment is not particularly limited in terms of the configuration thereof as long as it includes the GIS-type zeolite of the present embodiment, and examples of a typical configuration include an example illustrated in FIG. 2. An adsorbent 1 of the present embodiment, illustrated in FIG. 2, includes a filter 3 disposed at each of two positions closer to the inlet and the outlet in a container 2, and a plurality of zeolite particles 4 (the GIS-type zeolite of the present embodiment) disposed between such two filters 3. For example, a filter formed from quartz can be used for the filter 3. For example, when the adsorbent 1 is used for removal of carbon dioxide from natural gas, the natural gas can be introduced through an upper line and impurities can be removed therefrom by the filter 3, thereafter carbon dioxide is selectively adsorbed and removed by the zeolite particles 4, and a methane-rich gas can be taken out through a lower line. Herein, an object to be subjected to the adsorbent is not limited to natural gas, and the inner structure of the adsorbent is also not limited to the example illustrated in FIG. 2.

EXAMPLES

Hereinafter, the present embodiment will be described with reference to Examples and the like in more detail, but such Examples are illustrative, and the present embodiment is not intended to be limited to the following Examples. The following Examples can be variously modified and carried out as the present embodiment by those skilled in the art, and such modifications are encompassed within the scope of the present invention as long as these can satisfy predetermined requirements of the present embodiment.

[Crystal Structure Analysis]

Crystal structure analysis was performed according to the following procedure.

(1) A dried product obtained in each of Examples and Comparative Examples was used as a sample, and pulverized by an agate mortar.

(2) The sample in (1) above was uniformly secured on a non-reflective sample plate for powder, and crystal structure analysis was performed in the following conditions.

X-ray diffraction apparatus (XRD): powder X-ray diffraction apparatus "RINT2500 Model" (trade name) manufactured by Rigaku Corporation
  X-ray source: Cu tube (40 kV, 200 mA)
  Measurement temperature: 25° C.
  Measurement range: 5 to 60° (0.02°/step)
  Measurement speed: 0.2°/min
  Slit width (scattering, diffusion, light reception): 1°, 1°, 0.15 mm
(3) The resulting X-ray diffraction spectrum was subjected to data analysis using an XRD data analysis software "PDXL2" (software name, manufactured by Rigaku Corporation) with the value set in the analysis software, "α-cut value", being 3.00, thereby determining the peak 2θ value and the peak height. When no peak was here detected, the peak height was defined as 0.

[Gas Adsorption Isotherm Measurement]

Gas adsorption isotherm measurement was performed according to the following procedure.
(1) A calcined product obtained in each of Examples and Comparative Examples was used as a sample, and 0.2 g thereof was placed in a 12-mm cell (manufactured by Micromeritics Instrument Corporation).
(2) The sample placed in the cell of (1) above was mounted in a gas adsorption measuring apparatus "3-Flex" (trade name) manufactured by Micromeritics Instrument Corporation, and subjected to a degassing treatment with heating under vacuum at 250° C. and 0.001 mmHg or less for 12 hours.
(3) The sample placed in the cell after the treatment in (2) above was placed in constant-temperature circulating water at 25° C., and, after the sample temperature reached 25±0.2° C., measurement with liquefied carbon dioxide (produced by Sumitomo Seika Chemicals Co., Ltd., purity: 99.9% by mass or more) or methane gas (produced by Sumitomo Seika Chemicals Co., Ltd., purity: 99.9% by mass or more) was conducted with the absolute pressure being up to 0.25 to 760 mmHg. Here, the pressure was measured over time during the measurement, and it was determined that the amount of saturation adsorption was achieved when the pressure variation reached 0.001%/10 sec or less.

[Adsorption Selection Rate]

In gas adsorption isotherm measurement, when the amount of saturation adsorption of carbon dioxide into the GIS-type zeolite, measured when the GIS-type zeolite and carbon dioxide were placed in a system at 25° C. and 760 mmHg, was defined as a (cm$^3$/g) and the amount of saturation adsorption of methane into the GIS-type zeolite, measured when the GIS-type zeolite and methane were placed in a system at 25° C. and 760 mmHg, was defined as b (cm$^3$/g), the value (a/b) obtained by dividing a by b was calculated as the adsorption selection rate.

[Measurement of Aluminum and Phosphorus Concentrations]

The GIS-type zeolite was thermally dissolved in an aqueous sodium hydroxide solution or aqua regia, and appropriately diluted to provide a liquid, and the liquid was used to measure the aluminum and phosphorus concentrations in the zeolite by ICP-emission spectrochemical analysis (SPS3520UV-DD: apparatus name, manufactured by Seiko Instruments Inc.).

Example 1

207.30 g of water, 8.78 g of sodium hydroxide (NaOH, produced by Wako Pure Chemical Industries, Ltd.), 16.4 g of sodium aluminate (NaAlO2, produced by Wako Pure Chemical Industries, Ltd.) and 248.3 g of liquid glass No. 3 (produced by Kishida Chemical Co., Ltd.) were mixed, and stirred for 15 minutes, thereby preparing a mixed gel. The composition of the mixed gel was as follows: α=SiO$_2$/Al$_2$O$_3$=12.0, β=Na$_2$O/Al$_2$O$_3$=4.0, γ=P$_2$O$_5$/Al$_2$O$_3$=0.0, δ=H$_2$O/Al$_2$O$_3$=200 and ε=R/Al$_2$O$_3$=0.0. The mixed gel was loaded to a 1000-mL stainless autoclave with a fluororesin inner cylinder placed, and was subjected to hydrothermal synthesis at 130° C. for 5 days without stirring, a product was subjected to filtration and dried at 120° C., and thereafter a powdered zeolite was obtained.

An XRD spectrum of the resulting zeolite is illustrated in FIG. 1. It was confirmed from the spectrum that the resulting zeolite was a GIS-type zeolite. Furthermore, there were not observed any peaks derived from other zeolite, amorphous silica/alumina and the like, and therefore the resulting zeolite was evaluated to be a high-purity GIS-type zeolite. The peak intensity ratios obtained from the XRD pattern were as follows: A/B=1.72 and C/A=0.0.

The adsorption isotherms of $CO_2$ and $CH_4$ into the resulting GIS-type zeolite were measured, and thus the respective amounts of adsorption at 25° C. and 760 mmHg were as follows: $CO_2$: 52.4 cm$^3$/g and $CH_4$: 0.0 cm$^3$/g; and the adsorption selection rate (a/b) was ∞. The phosphorus concentration was measured by ICP-AES, and as a result, the aluminum concentration was 9.9% by mass and no phosphorus was detected.

Example 2

A zeolite was synthesized in the same manner as in Example 1 except that 116.4 g of water, 4.9 g of sodium hydroxide, 1.6 g of sodium aluminate and 103.4 g of liquid glass No. 3 were mixed and stirred for 1 hour. The composition of the mixed gel was as follows: α=SiO$_2$/Al$_2$O$_3$=51.2, β=Na$_2$O/Al$_2$O$_3$=15.4, γ=P$_2$O$_5$/Al$_2$O$_3$=0.0, δ=H$_2$O/Al$_2$O$_3$=1024 and ε=R/Al$_2$O$_3$=0.0.

From an XRD pattern of the resulting GIS-type zeolite, A/B=2.82 and C/A=0.0 were satisfied.

The adsorption isotherms of $CO_2$ and $CH_4$ of the resulting GIS-type zeolite were measured, and thus the respective amounts of adsorption at 25° C. and 760 mmHg were as follows: $CO_2$: 25.6 cm$^3$/g and $CH_4$: 0.0 cm$^3$/g; and the adsorption selection rate (a/b) was ∞. The aluminum concentration was 5.1% by mass and no phosphorus was detected.

Example 3

A zeolite was synthesized in the same manner as in Example 1 except that 463.4 g of water, 8.39 g of sodium hydroxide, 8.2 g of sodium aluminate, 124.1 g of liquid glass No. 3 and 1.2 g of an aqueous 85% by mass phosphoric acid solution (produced by Wako Pure Chemical Industries, Ltd.) were mixed and stirred for 15 minutes. The composition of the mixed gel was as follows: α=SiO$_2$/Al$_2$O$_3$=12.0, β=Na$_2$O/Al$_2$O$_3$=5.0, γ=P$_2$O$_5$/Al$_2$O$_3$=0.1, δ=H$_2$O/Al$_2$O$_3$=600 and ε=R/Al$_2$O$_3$=0.0.

From an XRD pattern of the resulting GIS-type zeolite, A/B=1.51 and C/A=0.0 were satisfied.

The adsorption isotherms of $CO_2$ and $CH_4$ of the resulting GIS-type zeolite were measured, and thus the respective amounts of adsorption at 25° C. and 760 mmHg were as follows: $CO_2$: 24.8 cm$^3$/g and $CH_4$: 0.05 cm$^3$/g; and the adsorption selection rate (a/b) was 496. The aluminum concentration was 10.2% by mass and the phosphorus concentration was 1.6% by mass.

Example 4

A zeolite was synthesized in the same manner as in Example 1 except that 193.7 g of water, 0.39 g of sodium hydroxide, 8.2 g of sodium aluminate and 124.1 g of liquid glass No. 3 were mixed and stirred for 12 hours, and then subjected to hydrothermal synthesis at 135° C. for 6 days without stirring. The composition of the mixed gel was as follows: $\alpha=SiO_2/Al_2O_3=12.0$, $\beta=Na_2O/Al_2O_3=3.0$, $\gamma=P_2O_5/Al_2O_3=0.0$, $\delta=H_2O/Al_2O_3=600$ and $\epsilon=R/Al_2O_3=0.0$.

From an XRD pattern of the resulting GIS-type zeolite, A/B=1.95 and C/A=0.32 were satisfied.

The adsorption isotherms of $CO_2$ and $CH_4$ of the resulting GIS-type zeolite were measured, and thus the respective amounts of adsorption at 25° C. and 760 mmHg were as follows: $CO_2$: 11.8 cm$^3$/g and $CH_4$: 0.0 cm$^3$/g; and the adsorption selection rate (a/b) was ∞. The aluminum concentration was 10.6% by mass and no phosphorus was detected.

Example 5

A zeolite was synthesized in the same manner as in Example 1 except that 70.2 g of water, 8.00 g of sodium hydroxide, 9.6 g of aluminum hydroxide (Al(OH)$_3$.H$_2$O: produced by Sigma-Aldrich) and 100.0 g of colloidal silica (Ludox HS-40, produced by W. R. Grace & Co.-Conn.) were mixed and stirred for 30 minutes, and then subjected to hydrothermal synthesis at 135° C. for 4 days without stirring. The composition of the mixed gel was as follows: $\alpha=SiO_2/Al_2O_3=13.3$, $\beta=Na_2O/Al_2O_3=3.0$, $\gamma=P_2O_5/Al_2O_3=0.0$ $\delta=H_2O/Al_2O_3=100$ and $\epsilon=R/Al_2O_3=0$.

From an XRD pattern of the resulting GIS-type zeolite, A/B=1.85 and C/A=0.08 were satisfied.

The adsorption isotherms of $CO_2$ and $CH_4$ of the resulting GIS-type zeolite were measured, and thus the respective amounts of adsorption at 25° C. and 760 mmHg were as follows: $CO_2$: 34.6 cm$^3$/g and $CH_4$: 0.1 cm$^3$/g; and the adsorption selection rate (a/b) was 346. The aluminum concentration was 8.3% by mass and no phosphorus was detected.

Comparative Example 1

277.00 g of water, 18.3 g of sodium hydroxide, 3.28 g of sodium aluminate and 41.4 g of liquid glass No. 3 were mixed, and stirred under a N2 atmosphere at 1800 rpm for 24 hours, thereby preparing a mixed gel. The composition of the mixed gel was as follows: $\alpha=SiO_2/Al_2O_3=10$, $\beta=Na_2O/Al_2O_3=14$, $\gamma=P_2O_5/Al_2O_3=0$, $\delta=H_2O/Al_2O_3=840$ and $\epsilon=R/Al_2O_3=0$. The mixed gel was subjected to hydrothermal synthesis at 100° C. for 24 hours with stirring at 1000 rpm, a product was subjected to filtration and dried at 120° C., and thereafter a powdered zeolite was obtained.

From an XRD pattern of the resulting GIS-type zeolite, A/B=0.93 and C/A=0.0 were satisfied.

The adsorption isotherms of $CO_2$ and $CH_4$ of the resulting GIS-type zeolite were measured, and thus the respective amounts of adsorption at 25° C. and 760 mmHg were as follows: $CO_2$: 0.67 cm$^3$/g and $CH_4$: 0.0 cm$^3$/g; and the adsorption selection rate (a/b) was co. The aluminum concentration was 7.8% by mass and no phosphorus was detected.

Comparative Example 2

196.48 g of water, 41.28 g of aluminum isopropoxide (produced by Sigma-Aldrich), 118.22 g of isopropylamine (produced by Wako Pure Chemical Industries, Ltd.) as an organic structure-directing agent, 21.0 g of colloidal silica (Ludox AS-40, produced by W. R. Grace & Co.-Conn.) and 46.1 g of an aqueous 85% by mass phosphoric acid solution were mixed, and stirred for 1 hour, thereby preparing a mixed gel. The composition of the mixed gel was as follows: $\alpha=SiO_2/Al_2O_3=1.39$, $\beta=Na_2O/Al_2O_3=0$, $\gamma=P_2O_5/Al_2O_3=1.98$, $\delta=H_2O/Al_2O_3=118.7$ and $\epsilon=R/Al_2O_3=19.59$. The mixed gel was subjected to hydrothermal synthesis at 160° C. for 120 hours without stirring, and a product was subjected to filtration and dried at 120° C., thereafter heated to 325° C. at a rate of 20° C./min under a helium gas atmosphere for removal of the structure-directing agent, and thereafter calcined at 325° C. for 10 minutes, thereby providing a powdered zeolite.

From an XRD pattern of the resulting GIS-type zeolite, A/B=1.38 and C/A=0.0 were satisfied. The aluminum concentration was 10.4% by mass and the phosphorus concentration was 14.2% by mass.

The adsorption isotherms of $CO_2$ and $CH_4$ of the resulting GIS-type zeolite were measured, and thus the respective amounts of adsorption at 25° C. and 760 mmHg were as follows: $CO_2$: 23.5 cm$^3$/g and $CH_4$: 2.2 cm$^3$/g; and the adsorption selection rate (a/b) was 10.7.

Comparative Example 3

832.0 g of water, 4.39 g of sodium hydroxide, 8.20 g of sodium aluminate and 124.1 g of liquid glass No. 3 were mixed, and stirred under a N2 atmosphere at 1800 rpm for 36 hours, thereby preparing a mixed gel. The composition of the mixed gel was as follows: $\alpha=SiO_2/Al_2O_3=12.0$, $\beta=Na_2O/Al_2O_3=4.0$, $\gamma=P_2O_5/Al_2O_3=0.0$, $\delta=H_2O/Al_2O_3=1009$ and $\epsilon=R/Al_2O_3=0.0$. The mixed gel was subjected to hydrothermal synthesis at 130° C. for 4 days without stirring, a product was subjected to filtration and dried at 120° C., and thereafter a powdered zeolite was obtained.

From an XRD pattern of the resulting GIS-type zeolite, A/B=1.74 and C/A=0.61 were satisfied.

The adsorption isotherms of $CO_2$ and $CH_4$ of the resulting GIS-type zeolite were measured, and thus the respective amounts of adsorption at 25° C. and 760 mmHg were as follows: $CO_2$: 3.40 cm$^3$/g and $CH_4$: 0.0 cm$^3$/g; and the adsorption selection rate (a/b) was co. The aluminum concentration was 11.8% by mass and no phosphorus was detected.

Comparative Example 4

To a liquid where 18 g of sodium metasilicate pentahydrate (Na$_2$O$_3$Si/5H$_2$O, produced by Sigma-Aldrich) and 210.0 g of water were mixed was added 127.1 g of triethanolamine (C$_6$H$_{25}$NO$_3$, produced by Carl Roth GmbH+Co. KG), and stirred at 600 rpm for 30 minutes. To the liquid was added a liquid where 2.34 g of sodium hydroxide and 148.0 g of water were mixed, and stirred at room temperature and 600 rpm for 30 minutes, thereby providing a mixed liquid containing no Al. The composition of the mixed liquid was as follows: $\alpha=SiO_2/Al_2O_3=0.0$, $\beta=Na_2O/Al_2O_3=0.0$, $\gamma=P_2O_5/Al_2O_3=0.0$, $\delta=H_2O/Al_2O_3=0$ and $\epsilon=R/Al_2O_3=0.0$. To a 1000-mL stainless autoclave with a fluororesin inner cylinder placed was loaded 1.134 g of an aluminum powder (Al, produced by Wako Pure Chemical Industries, Ltd.), the mixed liquid was placed therein and subjected to hydrothermal synthesis at 95° C. for 5 days for no aging period without stirring, a product was subjected to filtration and dried at 120° C., and thereafter a powdered zeolite was obtained.

From an XRD pattern of the resulting GIS-type zeolite, A/B=1.13 and C/A=0.05 were satisfied.

The adsorption isotherms of $CO_2$ and $CH_4$ of the resulting GIS-type zeolite were measured, and thus the respective amounts of adsorption at 25° C. and 760 mmHg were as follows: $CO_2$: 1.08 cm$^3$/g and $CH_4$: 0.2 cm$^3$/g; and the adsorption selection rate (a/b) was 5.4. The aluminum concentration was 22.8% by mass and no phosphorus was detected.

Comparative Example 5

194.23 g of water, 0.87 g of aluminum isopropoxide, 129.5 g of isopropylamine and 24.0 g of colloidal silica (Ludox AS-40) were mixed for 5 minutes with stirring at 1000 rpm. Furthermore, the resultant was aged by stirring at 1000 rpm for 1 hour, thereby preparing a mixed gel. The composition of the mixed gel was as follows: $\alpha=SiO_2/Al_2O_3=75.1$, $\beta=Na_2O/Al_2O_3=0.0$, $\gamma=P_2O_5/Al_2O_3=0.0$, $\delta=H_2O/Al_2O_3=5442$ and $\varepsilon=R/Al_2O_3=1018$. The mixed gel was subjected to hydrothermal synthesis at 140° C. for 6 days without stirring, and a product was subjected to filtration and dried at 120° C., thereafter heated to 325° C. at a rate of 20° C./min under a helium gas atmosphere for removal of the structure-directing agent, and thereafter calcined at 325° C. for 10 minutes, thereby providing a powdered zeolite.

From an XRD pattern of the resulting GIS-type zeolite, A/B=1.41 and C/A=0.0 were satisfied.

The adsorption isotherms of $CO_2$ and $CH_4$ of the resulting GIS-type zeolite were measured, and thus the respective amounts of adsorption at 25° C. and 760 mmHg were as follows: $CO_2$: 28.3 cm$^3$/g and $CH_4$: 2.9 cm$^3$/g; and the adsorption selection rate (a/b) was 9.8. The aluminum concentration was 0.7% by mass and no phosphorus was detected.

The ratio A/B in Table 1 was determined as follows. A/B=(Height of peak around 2θ=12.4°)/(Height of peak around 2θ=21.6°)

The present application is based on Japanese Patent Application (Japanese Patent Application No. 2016-241319) filed on Dec. 13, 2016 and Japanese Patent Application (Japanese Patent Application No. 2017-023238) filed on Feb. 10, 2017, the contents of which are herein incorporated by reference.

INDUSTRIAL APPLICABILITY

The GIS-type zeolite according to the present invention has industrial applicability to separating agents or separation membranes for various gases and liquids, electrolyte membranes for fuel cells and the like, fillers of various resin molded articles, membrane reactors, catalysts for hydrocracking, alkylation and the like, catalyst carriers for carrying metals, metal oxides, and the like, adsorbents, desiccants, detergent aids, ion exchangers, waste water treatment agents, fertilizers, food additives, cosmetic additives, and the like.

REFERENCE SIGNS LISTS 1 adsorbent
2 container
3 filter
4 zeolite particle

The invention claimed is:

1. A GIS-type zeolite having an aluminum atom content of 1% by mass or more and a phosphorus atom content of 4% by mass or less, wherein
   a, being an amount of saturation adsorption of carbon dioxide into the GIS-type zeolite, measured when the GIS-type zeolite and carbon dioxide are placed in a system at 25° C. and 760 mmHg, is 11.8 cm$^3$/g or more at 25° C. and 760 mmHg,
   wherein, when heights of peaks around 2θ=12.4 and 21.6° in a peak obtained by X-ray diffraction are defined as A and B, respectively, 1.37<A/B is satisfied.

2. The GIS-type zeolite according to claim 1, wherein, when heights of peaks around 2θ=12.4 and 26.0° in a peak

TABLE 1

| | Peak height ratio | | Aluminum concentration | Phosphorus concentration | Amount of adsorption of gas (cm$^3$/g) | | Adsorption selection rate |
|---|---|---|---|---|---|---|---|
| | A/B | C/A | (% by mass) | (% by mass) | Amount of adsorption of $CO_2$ | Amount of adsorption of $CH_4$ | |
| Example 1 | 1.72 | 0 | 9.9 | 0 | 52.4 | 0 | ∞ |
| Example 2 | 2.82 | 0 | 5.1 | 0 | 25.6 | 0 | ∞ |
| Example 3 | 1.51 | 0 | 10.2 | 1.6 | 24.8 | 0.05 | 496 |
| Example 4 | 1.95 | 0.32 | 10.6 | 0 | 11.8 | 0 | ∞ |
| Example 5 | 1.85 | 0.08 | 8.3 | 0 | 34.6 | 0.1 | 346 |
| Comparative Example 1 | 0.93 | 0 | 7.8 | 0 | 0.67 | 0 | ∞ |
| Comparative Example 2 | 1.38 | 0 | 10.4 | 14.2 | 23.5 | 2.2 | 10.7 |
| Comparative Example 3 | 1.74 | 0.61 | 11.8 | 0 | 3.4 | 0 | ∞ |
| Comparative Example 4 | 1.13 | 0.05 | 22.8 | 0 | 1.08 | 0.2 | 5.4 |
| Comparative Example 5 | 1.41 | 0 | 0.7 | 0 | 28.3 | 2.9 | 9.8 | obtained by X-ray diffraction are defined as A and C, respectively, 0.35>C/A is satisfied.

3. The GIS-type zeolite according to claim 1, wherein the GIS-type zeolite is silica/alumina.

4. The GIS-type zeolite according to claim 1, wherein A/B is more than 1.50.

5. The GIS-type zeolite according to claim 1, wherein A/B is 1.85 or more.

6. An adsorbent comprising the GIS-type zeolite according to claim 1.

* * * * *